United States Patent [19]

Kaiser et al.

[11] Patent Number: 5,646,523
[45] Date of Patent: Jul. 8, 1997

[54] APPARATUS FOR DETERMINING ANGULAR POSITION OF A MOTOR VEHICLE STEERING WHEEL

[76] Inventors: Harry Kaiser, Weberstrasse 37, D-71706 Markgröningen; Manfred Abendroth, Strombergstrasse 9/1, D-71672 Marbach, both of Germany

[21] Appl. No.: 553,526

[22] PCT Filed: Mar. 14, 1995

[86] PCT No.: PCT/DE95/00343

§ 371 Date: Oct. 23, 1995

§ 102(e) Date: Oct. 23, 1995

[87] PCT Pub. No.: WO95/25660

PCT Pub. Date: Sep. 28, 1995

[30] Foreign Application Priority Data

Mar. 23, 1994 [DE] Germany .................. 44 09 892.8

[51] Int. Cl.⁶ .................. G01B 7/30; B62D 15/02; G01D 5/249
[52] U.S. Cl. .................. 324/207.2; 180/400; 324/207.25; 341/15
[58] Field of Search .................. 324/207.16, 207.2, 324/207.21, 207.22, 207.25; 341/13–15, 113; 180/400

[56] References Cited

U.S. PATENT DOCUMENTS 5,248,939   9/1993   Brauer .................. 324/174

FOREIGN PATENT DOCUMENTS

| 0377097 | 1/1989 | European Pat. Off. . |
| 0489350 | 11/1991 | European Pat. Off. . |
| 477653 | 4/1992 | European Pat. Off. . |
| 4220883 | 6/1992 | Germany . |
| 92/17719 | 10/1992 | WIPO . |

OTHER PUBLICATIONS

Montgomery, Jeff D. "Optical Shaft Encoders", Machine Design, Sep. 12, 1985, vol. 57, No. 20, pp. 89–90.
Wolf et al., "Absolute encoders find increased application", I & CS Feb., 1989, vol. 62, No. 2, pp. 67–69.

Primary Examiner—Gerard R. Strecker
Attorney, Agent, or Firm—Michael J. Striker

[57] ABSTRACT

The apparatus for determination of absolute angular position of a steering wheel (w) rotatable through several revolutions includes a fine code disk(2) nonrotatably attached to the steering column (c) and provided with circumferentially distributed code elements (2',2", 2"', ... ) and circumferentially distributed code element sensors (5) for sensing the code elements (2", 2", 2"', ... ) to generate fine signals which repeat after each revolution of the steering wheel and are indicative of a relative steering wheel angular position during each revolution; and a coarse code disk (7) provided with at least three code tracks (A,B,C, ... ) and at least three code track sensors (8a, 8b, 8c , ... ) for sensing respective code tracks (A,B,C, ... ) to generate a progressive 3-bit coded signal indicative of the absolute steering wheel angular position over the several revolutions. The apparatus also includes a gear device (11,7') for rotatably driving the coarse code disk (7) with the fine code disk(2) having a predetermined gear reduction ratio and a microcontroller (13) for logically combining and evaluating the coarse and fine signals to determine the absolute steering wheel angular position, so that the absolute steering wheel angular position can be determined with a precision according to the finer angular tolerances of the device for generating the fine signals.

4 Claims, 3 Drawing Sheets

| weighting of coarse signal | value of precision signal | No. of revolutions |
|---|---|---|
| 0 | α < 180°<br>α > 180° | 1<br>4 |
| 1 | α < 300°<br>α > 300° | 4<br>3 |
| 3 | α < 60°<br>α > 60° | 4<br>3 |
| 4 | α < 60°<br>α > 60° | 2<br>1 |
| 6 | α < 300°<br>α > 300° | 2<br>1 |
| 7 | α < 180°<br>α > 180° | 3<br>2 |

APPARATUS FOR DETERMINING ANGULAR POSITION OF A MOTOR VEHICLE STEERING WHEEL

BACKGROUND OF THE INVENTION

The invention relates to an apparatus for determining absolute angular position of a steering wheel of a motor vehicle rotatable over several complete revolutions.

For certain safety systems in motor vehicles (for example automatic rear axle steering, vehicle dynamics control), for safety reasons the current steering wheel position is required immediately after the vehicle is started. In particular, sensors with an incremental mode of operation, in which the angle increments are arranged in only one track, can only fulfill this requirement insufficiently since an index mark must be reached in all cases before the sensor supplies a valid measurement value. Furthermore, such a steering wheel angle sensor must supply a measurement value in the range ±720°. This means that a second system must be present within the sensor, which detects the angle values which exceed one revolution. This system must also supply a valid angular position value immediately after the ignition is switched on.

Analog sensor systems, such as potentiometers (Patent Document EP 0 477 653 A1) as such fulfill this requirement, but have the disadvantage that they do not operate in a wear-free manner and in this regard do not fulfill the requirements for a safety system.

Sensing apparatus for digital systems which make absolute measurements (sensing of a plurality of code tracks within one revolution) are too complex and cannot be cost-effectively accommodated by known means in the existing physical space, or only with difficulty (Patent Document EP 0 489 350 A1).

DE-P 42 20 883 discloses a steering angle sensor in which two fine signals are generated, which are shifted with respect to one another and are repeated every 360°. Furthermore, a coarse signal is generated which extends over an angular range of four revolutions of the steering wheel and makes it possible to identify which revolution the steering wheel is in.

Another known absolute angle sensing apparatus is based on a single-track incremental code which, in conjunction with a plurality of sensors, supplies an absolute value within one revolution of the steering wheel (Patent Document EP 0 377 097 B1). However, this latter angular position sensing apparatus cannot detect steering wheel angles which exceed 360°. This disadvantage has been previously remedied by suitably storing the last valid angular position value, including the number of steering wheel revolutions (usually by means of an electronic memory) after initializing the angle measurement system and by retrieving and using this stored value when the vehicle is started again. A necessary condition for this is that the position of the steering wheel no longer changes after the ignition is switched off. However, since this cannot be ruled out in all cases, the sensor is often not disconnected from the electrical system of the vehicle after the ignition is switched off, so that changes in the angular position of the steering wheel can be detected even after the ignition is switched off. In such cases, the sensors are switched to a standby mode, so that the battery of the vehicle does not discharge too quickly. There is still always the risk of the supply voltage failing, because the sensing apparatus then loses its stored information regarding the number of revolutions of the steering wheel in such cases. After such events, the sensor must be initialized again by means of a special procedure, which as a rule can only take place in special workshops.

It would therefore be desirable to have an apparatus for determining absolute angular position of a motor vehicle steering wheel which would supply the absolute angle within the steering wheel angular travel range of ±720° immediately when the ignition is switched on. A purely digital method of operation of the sensor within the entire steering wheel angular range would also be desirable to avoid complex adjustment procedures.

SUMMARY OF THE INVENTION

It is an object of the present invention to provide an apparatus for determining the absolute angular position of a motor vehicle steering wheel rotatable over several complete revolutions, which does not have the above-described disadvantages.

According to the invention, the apparatus for determination of absolute angular position of a motor vehicle steering wheel and attached steering column rotatable through a plurality of revolutions includes means for generating fine signals indicative of a relative angular position of the steering wheel during each of the revolutions, said means for generating said fine signals comprising a fine code disk nonrotatably connected to the steering column and provided with circumferentially disposed code elements and a plurality (n) of code element sensor means for sensing the code elements and for generating the fine signals so that the fine signals repeat after each steering wheel revolution;

means for generating coarse signals indicative of an absolute angular position of said steering wheel and said steering column over a plurality of revolutions thereof comprising a coarse code disk provided with at least three code tracks and at least three code track sensor means for sensing respective code tracks and for generating a 3-bit coded signal indicative of the absolute angular position of the steering wheel over the entire plurality of revolutions;

gear means for rotatably driving the coarse code disk with the fine code disk with a predetermined gear reduction ratio, so that an angular resolution of the means for generating coarse signals is lower than an angular resolution of the means for generating fine signals; and means for logically combining and evaluating the coarse signals and the fine signals to determine the absolute angular position of the steering wheel and the steering column comprising a microcontroller, whereby the absolute angular position of the steering wheel can be determined with a precision according to the higher angular resolution of the means for generating the fine signals.

The apparatus for determining the absolute angular position of a motor vehicle steering wheel rotatable over several complete revolutions has the advantage that an unambiguous relationship between the fine signal and the coarse signal is possible over the entire angular range to be detected. Therefore, there are no longer any angular ranges in which it is not possible to make an unambiguous statement about the particular revolution in which the steering column is positioned.

It is particularly advantageous that, in the coarse system, the tolerance requirements which occur during assembly are very largely eliminated by the code formed from at least three code tracks.

The evaluation of the coarse system and the processing of the digital fine signals and coarse signals can be accomplished using a single microcontroller. The physical arrangement of the sensors for the fine system and coarse system on a common circuit carrier permits a simple design for the entire apparatus.

Several preferred embodiments are possible. It is particularly advantageous that Hall sensors with a switching output can be used for the fine system and the coarse system. Advantageously each code element sensor means and code track sensor means is a Hall effect magnetic barrier sensor.

In a preferred embodiment there are nine code element sensor devices on the fine code disk and the code elements and code element sensor devices are arranged so as to provide a continuous progressive absolute code for the fine signal over each revolution. Preferably the predetermined gear reduction ratio is 1:4, so that the coarse code disk makes one revolution for every four revolutions of the steering wheel and the fine code disk.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
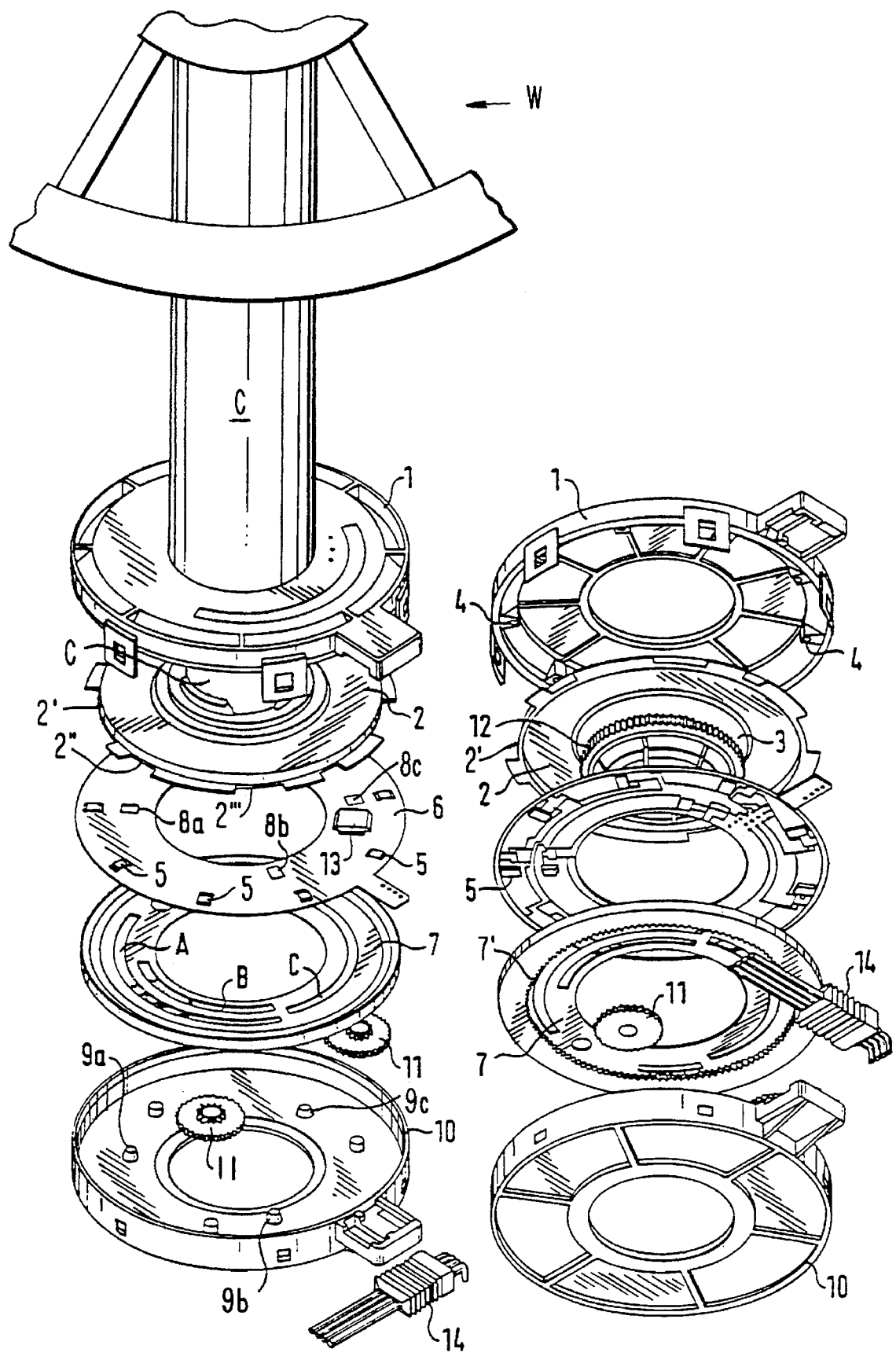
FIGS. 1a and 1b are respectively top and bottom exploded perspective views of one embodiment of the sensing apparatus according to the invention.

The system described in more detail hereinbelow achieves the object of the invention.

The invention relates to a device for determining the rotation angle of a vehicle steering wheel with an apparatus arranged on the end of the steering column which is closest to the steering wheel, comprising a fine code disk which is encoded with a so-called Gray code in a single-track strip structure, with which Gray code the absolute value of the rotation angle can be identified within one revolution of the steering wheel, and a coarse code disk which, together with a reducing gear unit, permits the steering wheel rotation angle for angles greater than 360° to be determined.

DETAILED DESCRIPTION OF THE FINE SYSTEM FOR DETERMINING ANGULAR POSITION WITHIN ONE STEERING WHEEL REVOLUTION

The fine system comprises a fine code disk which contains recesses in its edge disposed around its circumference within one track which act as code elements. A plurality of code element sensors are arranged at uniform angle intervals around the circumference of the fine disk so that a coded signal is produced by the interaction of the fine code disk and these sensors during rotation of the fine code disk. The coded signal permits the determination of absolute angular position values within one revolution of the steering wheel.

In the exemplary embodiment, the fine code disk is made of magnetically highly permeable sheet metal and is permanently connected to the steering column (for example, by means of a positively locking connection). The recesses in the fine code disk, which rotates with the steering column, are preferably sensed by nine sensors (Hall effect magnetic barrier sensors comprising a magnet spaced from a Hall sensor between which the edge portion of the fine code disk passes) which are arranged around on the circumference, a "1" being produced if there is no sheet metal segment between the magnet and the Hall sensor of the Hall effect magnetic barrier sensor and a "0" being produced if the magnetic flux is interrupted by a segment of sheet metal of the fine code disk.

The resolution or switching accuracy of the Hall effect magnetic barrier sensor provides a sufficiently low angular position resolution of approximately 2°. The advantage of such an arrangement is its robustness, in particular the immunity to contamination and the large temperature range in which such Hall effect magnetic barrier sensors operate reliably. Extraneous influences can be largely excluded. The arrangement can be of extraordinarily flat construction.

DESCRIPTION OF THE COARSE SYSTEM

In motor vehicles, the steering wheel angle has to be continuously measured within ±2 revolutions of the steering wheel, i.e. the steering wheel must be rotated a number of times in order to move from the left-hand to the right-hand stop.

Various solutions are possible for the detection of the number of revolutions. According to the invention, in the exemplary embodiment, a second coarse code disk is provided which is driven by a gearbox, which produces a direct relationship between the rotational angle of the steering wheel and the number of revolutions. The gearbox itself is preferably an epicyclical gear unit with a reduction ratio of exactly 4:1. This reduction ratio is favorable in order to be able to permit the apparatus to operate without stopping. Thus, after four revolutions of the steering wheel in each case the same initial conditions are always produced.

The coarse code disk is made, like the fine code disk, of magnetically highly permeable sheet metal. It bears three code tracks (throughgoing openings) A, B, C, which are also sensed with Hall effect magnetic barrier sensors. Three code tracks are necessary in order to ensure the unambiguousness of the relationship between the coarse signal and fine signal, in particular at the moment when the system is switched on.

Figure 2:
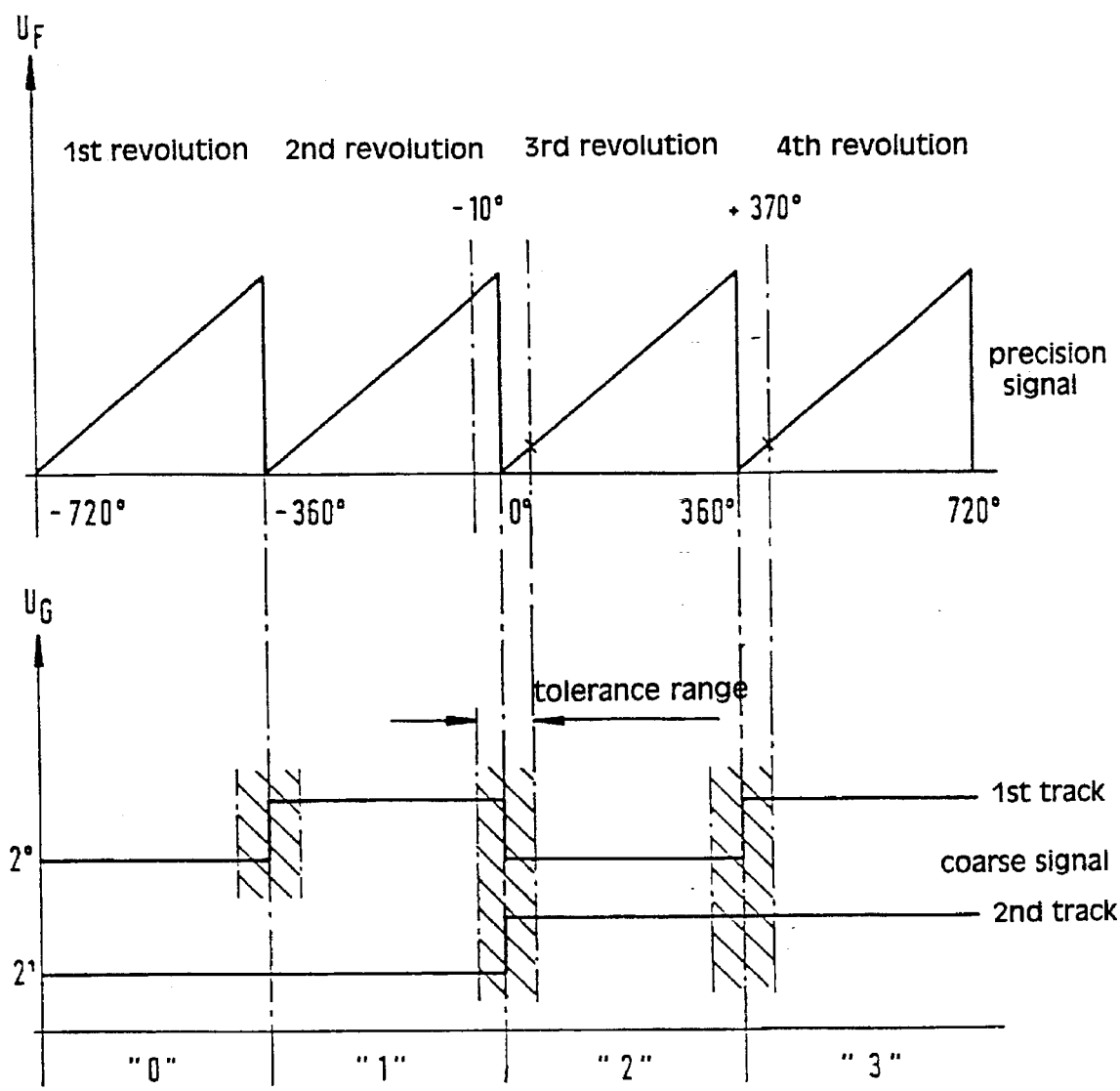
FIG. 2 shows graphical illustrations of sensor signal voltages for fine and coarse signals in the sensor apparatus according to the invention versus absolute angle within a steering wheel angular range of ±720° in the sensor apparatus according to the invention.

If the coarse signal were to be produced by means of only two code tracks, with which it would of course be possible actually to code two revolutions of the steering wheel, because of the larger tolerances within the coarse system, problems would arise in producing an unambiguous relationship between the fine signal and coarse signal in the changeover region between two revolutions (see FIG. 2).

If, for example, a "2" is detected by the coarse signal and the precision angle lies in the region around "0°", the absolute angle, which of course must be composed of the fine signal and coarse signal, can be assigned both to the second and to the third revolution. The required unambiguousness is therefore not given in this range. Even a logical connection between the fine signal and coarse signal does not provide unambiguous results.

The lower angular resolution of the coarse system, and the larger tolerance range, associated with this, for the changeover between two revolutions of the steering wheel are due to the use of the same sensing principle as in the fine system with simultaneous reduction of the rotational angle by the factor 4, so that a lower angular resolution within the coarse system of approximately ±10° must be expected. Furthermore, further tolerance-increasing influences, such as play of gears, of bearings etc., also have effects.

The relationship problems between the fine signal and coarse signal when only two code tracks are used are illustrated in FIG. 2. It is clear that there are unavoidable angular ranges in which no unambiguous absolute angle can be stipulated within the entire angular range a the moment of starting.

Figures 3A, 3B:
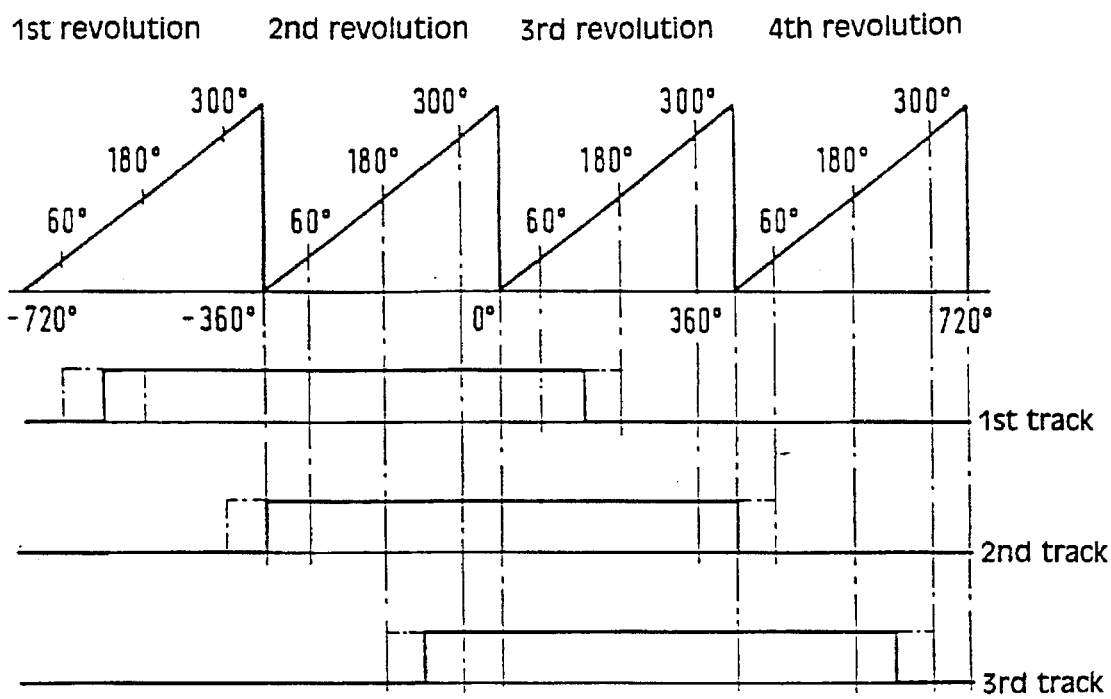
FIG. 3a is a graphical illustration showing three code tracks for generating the coarse signal as it varies over absolute angle within a steering wheel angular range of ±720°.
FIG. 3b is a table showing the codes that result from operation of the sensor apparatus according to the invention.

According to the invention, the problem is solved by introducing a third code track. As a result, the coarse system supplies a 3-bit item of information for four revolutions of the steering wheel. One possible relationship between the three code tracks of the coarse system and the fine system which measures in terms of absolute values is illustrated in FIG. 3a. By means of the three code tracks provided, a weighting of the coarse signal in the range 0 . . . 7 can be generated by means of three associated sensors. If it is again assumed that it is only possible to carry out the detection of code transitions of the coarse signal within a tolerance range of ±10°, it is not yet readily possible to ensure an unambiguous relationship between the fine system and coarse system in the region of the transitions here either.

However, in contrast with the two-track solution the steering wheel angle can be determined unambiguously using the fine signal if the ambiguous weightings of the coarse signal are logically combined using the rules in FIG. 3b. This logical combination is carried out with a microcontroller or a similar device which is an integral component of the apparatus.

DESCRIPTION OF THE PREFERRED EMBODIMENT

FIGS. 1a and 1b show a preferred embodiment of the sensing apparatus according to the invention.

A fine code disk 2 is rotatably mounted in a lid 1 permanently connected to the chassis of the vehicle. The fine code disk 2 comprises a circular sheet metal component and is provided with recesses 2',2", 2"', . . . in its edge distributed around its circumference and acting as code elements. Furthermore, a hollow shaft 3 is attached to the fine code disk 2, which permits a positively locking connection to the steering column c, so that the fine code disk 2 rotates together with the steering column c which is attached to the steering wheel w.

The recesses 2',2", 2"', . . . of the fine code disk 2 pass through nine Hall effect magnetic barrier sensors 4,5 as the fine code disk rotates. Each Hall effect magnetic barrier sensor 4,5 comprises a Hall sensor 5 mounted on a circuit carrier 6 and a magnet 4 mounted in the lid 1 opposite to the associated Hall sensor 5. The nine bar magnets 4 are spaced an equal angular distance from one another in the lid 1.

If a segment of the fine code disk 2 is located between a magnet 4 and Hall sensor 5, the Hall sensor produces the value "0". Each of the nine Hall effect magnetic barrier sensors produces one bit position in the digital code signal of the absolute system.

A 9-bit code signal is generated by the nine magnetic Hall sensors. The nine Hall sensors produce an absolute code signal as the fine code disk 2 rotates, i.e. a continuous progressive code, one, and only one bit position changing after each angular increment.

The 9-bit code signal permits an angular resolution of 0.8. However, this possible resolution is limited by the switching hysteresis of the Hall effect magnetic barrier sensors, their temperature response and by the positional tolerances of the magnetic Hall arrangement. In the exemplary embodiment, the angular position resolution for the means for generating the fine signal is 2.5°.

The means for generating the coarse signals includes a coarse code disk 7 made of highly magnetically permeable material. The coarse code disk 7 has 3 circular code tracks which are arranged at different intervals spaced from each other in the radial direction on the coarse code disk 7. The code of this coarse system is formed by throughgoing openings provided within these circular tracks. Exactly as in the case of the fine system, the code is scanned by means of Hall effect magnetic barrier sensors. Each of the Hall effect magnetic barrier sensors includes a Hall sensor 8a, 8b or 8c mounted on the circuit carrier 6. The associated magnets 9a, b and c which are assigned to the respective Hall sensors 8a, b and c are arranged in the base 10 of the apparatus.

The coarse disk 7 simultaneously forms an internally toothed gear wheel 7' of a gearbox, which is driven by 3 two-stage gear wheels 11 (only two are shown in the drawing). The gear wheels 11 are driven themselves by a central gear wheel 12 which is an integral component of the hollow shaft 3. In the exemplary embodiment, the internally toothed gear wheel 7' is part of the code disk 7. The three two-stage planetary gear wheels 11 are supported on unshown journals fixed in the floor 10 of the casing. This is therefore a two-stage pedestal gearing unit in which the output wheel is formed by an internally toothed wheel. The reduction ratio is exactly 4:1 in order to permit the apparatus to "carry on rotating" (avoiding a stop). The coarse code disk 7 therefore rotates precisely once for every 4 revolutions of the steering wheel. As a result, it is ensured that the relationship between the fine signal and the coarse signal is not lost, if the apparatus is inadvertently "rotated" before installation.

On the circuit carrier 6 there is, in addition to the 12 Hall sensors 5 and 8a–c, the electronic evaluation unit 13 as well, a microcontroller in the exemplary embodiment.

The microcontroller 13 reads via its ports the code generated by the code disks 2 and 7, and generates, with an internal program, the absolute angle associated with the code, checks the identified values for plausibility and passes on the calculated steering angle via a serial interface (preferably using a standardized CAN format) to a superordinate control unit via a connection cable 14.

Optical or inductive means can be used as sensors, and the code disks then have to be correspondingly adapted.

By "absolute angular position" is meant the angular displacement in angular units that the steering wheel is rotated from its zero or rest position to reach that angular position.

While the invention has been illustrated and described as embodied in an apparatus for determining absolute angular position of a steering wheel of a motor vehicle rotatable over several complete revolutions, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for determination of absolute angular position of a motor vehicle steering wheel (w) and steering column (c) attached to said steering wheel, said steering wheel and said steering column being rotatable through a plurality of revolutions, said apparatus comprising means for generating fine signals indicative of a relative angular position of said steering wheel during each of said revolutions, said means for generating said fine signals comprising a fine code disk (2) nonrotatably attached to said steering column and provided with circumferentially distributed code elements (2',2", 2''', ...) and a plurality (n) of circumferentially distributed code element sensor means (5) for sensing said code elements (2',2", 2''', ...) and for generating said fine signals so that said fine signals repeat after each revolution of said steering column; and means for generating coarse signals indicative of an absolute angular position of said steering wheel and said steering column over the entire plurality of said revolutions thereof, said means for generating coarse signals comprising a coarse code disk (7) provided with at least three code tracks (A,B,C, ...) spaced from each other on said coarse code disk (7) and at least three code track sensor means (8a, 8b, 8c , ...) for sensing respective ones of said at least three code tracks (A,B, C, ...) and for generating a 3-bit coded signal indicative of said absolute angular position of the steering wheel over said plurality of said revolutions;

gear means (11,7') for rotatably driving said coarse code disk (7) with said fine code disk(2), said gear means (11,7') connecting said fine code disk and said coarse code disk to drive said coarse code disk with a predetermined gear reduction ratio, whereby an angular resolution of said means for generating the coarse signals is lower than an angular resolution of said means for generating the fine signals; and means for logically combining and evaluating said coarse signals and said fine signals to determine said absolute angular position of said steering wheel and said steering column, said means comprising a microcontroller (13), so that said absolute angular position of said steering wheel can be determined with a precision according to the higher angular resolution of said means for generating said fine signals.

2. The apparatus as defined in claim 1 wherein each of said code element sensor means (5) and said at least three code track sensor means (8a,8b,8c , ...) comprises a Hall effect magnetic barrier sensor, each of said Hall effect magnetic barrier sensors comprises a magnet (4; 9a,9b,9c) and a Hall sensor (5; 8a,8b,8c) positioned opposite to said magnet, said fine code disk (2) is made of sheet metal, each of said code elements (2',2", 2''', ...) in said fine code disk (2) consists of a recess in an edge of said fine code disk (2), said magnet (4) and said Hall sensor (5) of each of said Hall effect magnetic barrier sensors for said code elements are located on opposite sides of said fine code disk (2) to detect the presence of said recess or a segment of said fine code disk (2) between said magnet (4) and said Hall sensor (5), said coarse code disk (7) is made of magnetically permeable material, each of said at least three code tracks (A,B,C, ...) in said coarse code disk (7) is provided with a circular arc-shaped throughgoing opening, said magnet (9a, 9b,9c) and said Hall sensor (8a,8b,8c ) of each of said Hall effect magnetic barrier sensors for said at least three code tracks (A,B,C, ...) are located on opposite sides of said coarse code disk (7) to detect the presence of said arc-shaped opening or a portion of said magnetically permeable material of said coarse code disk (2) therebetween.

3. The apparatus as defined in claim 1 having nine of said code element sensor means (5) distributed circumferentially around said fine code disk (2), and said code elements and said code element sensors(5) are arranged so as to provide a continuous progressive absolute code for the fine signal during each of said revolutions.

4. The apparatus as defined in claim 1, wherein said predetermined gear reduction ratio is 1:4, so that said coarse code disk (7) makes exactly one revolution for every four revolutions of the steering wheel (w) and the fine code disk (2).

* * * * *